United States Patent [19]
Dingeldey

[11] Patent Number: 4,676,174
[45] Date of Patent: Jun. 30, 1987

[54] COLLAPSIBLE WORK TABLE

[76] Inventor: Robert A. Dingeldey, 2220 Euna Rd., Wixom, Mich. 48096

[21] Appl. No.: 776,376

[22] Filed: Sep. 16, 1985

[51] Int. Cl.⁴ .................................................. A47B 3/06
[52] U.S. Cl. ...................................... 108/153; 108/111
[58] Field of Search ............... 108/153, 116, 123, 112, 108/111, 107, 115; 248/243

[56] References Cited

U.S. PATENT DOCUMENTS

| | | | |
|---|---|---|---|
| 1,099,849 | 6/1914 | Hammond | 108/111 X |
| 1,113,818 | 10/1914 | O'Brien | 108/111 |
| 1,198,431 | 9/1916 | Forsyth | 108/111 |
| 1,304,847 | 5/1919 | Blais et al. | 108/111 |
| 3,244,127 | 4/1966 | Evans | 108/111 X |
| 3,669,036 | 6/1972 | Marschak | 108/111 X |
| 3,841,237 | 10/1974 | Plymate | 108/112 X |
| 4,202,278 | 5/1980 | Wadenhed | 108/111 X |
| 4,397,432 | 8/1983 | Resetar | 248/243 X |

*Primary Examiner*—Kenneth J. Dorner
*Assistant Examiner*—José V. Chen
*Attorney, Agent, or Firm*—Basile, Weintraub & Hanlon

[57] ABSTRACT

A collapsible work table provides a work surface of an adjustable height, and may be collapsed into a compact package for transport to job sites in the field.

1 Claim, 3 Drawing Figures

U.S. Patent  Jun. 30, 1987  4,676,174
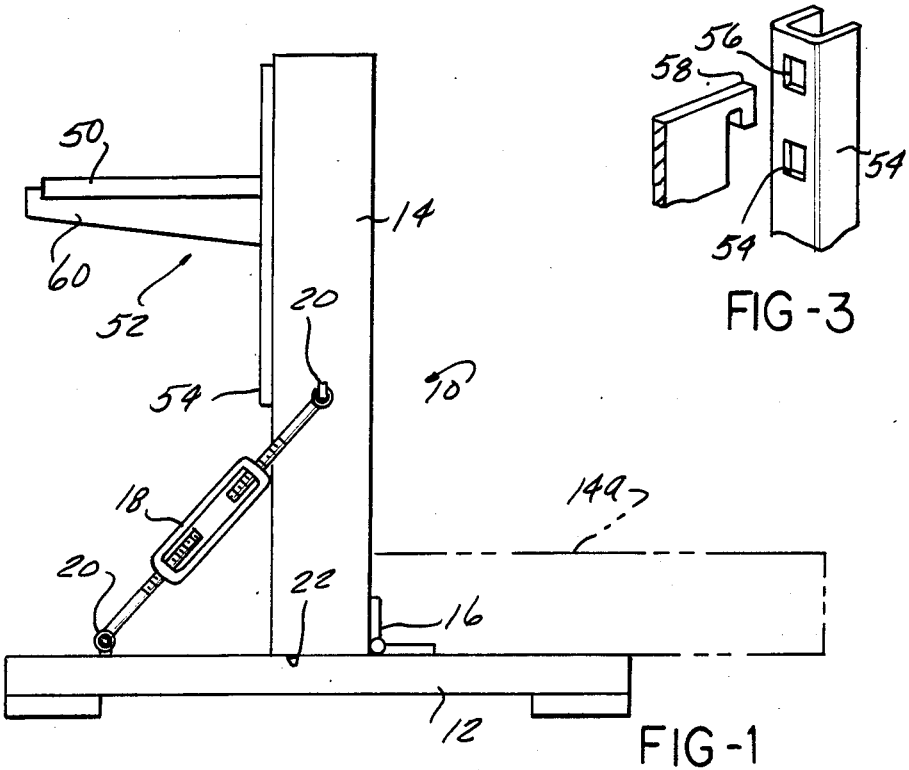
FIG-3
FIG-1
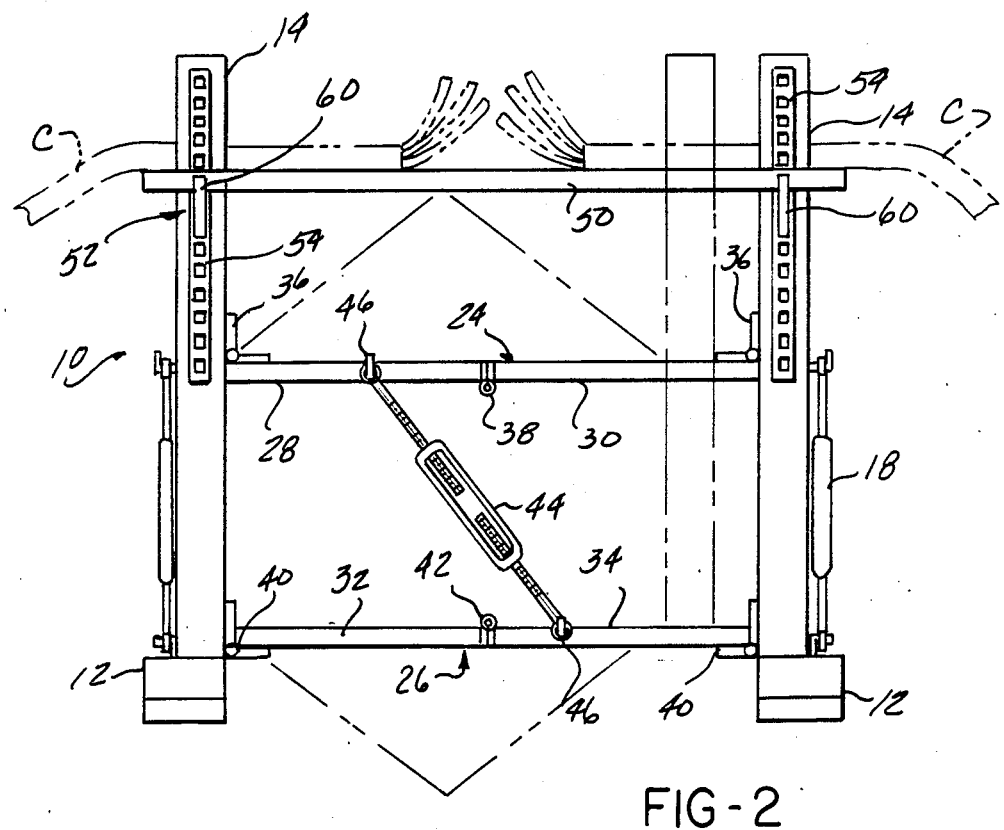
FIG-2

COLLAPSIBLE WORK TABLE

BACKGROUND OF THE INVENTION

The present invention is directed to a collapsible work table which, when erected, will provide a work table surface of adjustable height and which, when collapsed, is of compact configuration for convenience and transporting the table to and from a work site. Although capable of use for other purposes, the table of the present invention was specifically designed for use in splicing multi-strand communication cables in the field.

SUMMARY OF THE INVENTION

A table embodying the present invention is constructed with two like side frame assemblies each of which includes an elongate, horizontally extending base member and a post hingedly connected to the base member near its mid-point for movement between a collapsed position in which the post lies flat against the top of the base member and an erected position in which the post projects vertically upwardly from the longitudinal mid-point of the base member. A turnbuckle coupled to the post and to the base member is employed to releasably retain the post in its erected position.

The two side assemblies are interconnected to each other by upper and lower cross brace assemblies hingedly connected at each end to the respective posts at locations which are vertically spaced from each other when the posts are erected. Each cross brace assembly includes two rigid brace members hingedly connected end to end with the hinge axis of the interconnection between the two braces of the upper member at the lower side of the members and that of the lower brace assembly at the upper side of the two base members. When the table is in its operating position, with the posts erected the two cross brace assemblies extend horizontally between the posts to hold the two side assemblies in a laterally spaced relationship. A turnbuckle interconnected between the two cross brace assemblies releasably maintain cross brace assemblies in this latter position. When the turnbuckle is removed, the two side assemblies may be shifted laterally, toward each other, the cross brace assemblies folding at each post and about the central hinges to accomodate this movement.

Each post has mounted upon one side a channel shaped member of an adjustable shelf mounting of conventional construction in which a channel shaped member is fixedly mounted within a vertical groove within the post and formed with vertically spaced slots which receive the hook of a shelf supporting brace fixture. The brace fixtures are located at the appropriate height when the post are erected and a shelf seated upon the brace fixtures provides the working surface of the table.

Other objects and features of the invention will become apparent by reference to the following specification and to the drawings.

BRIEF DESCRIPTION OF THE DRAWINGS

FIG. 1 is a side elevational view of a collapsible work table embodying the present invention;

FIG. 2 is a front view of the table of FIG. 1;

FIG. 3 is a detailed perspective view showing portions of an adjustable support assembly employed on the table of FIGS. 1 and 2.

A collapsible table embodying the present invention includes a pair of like side frame assemblies designated generally 10 each of which includes an elongate horizontally extending base member 12 and a post 14. Each post 14 is coupled at one side of its lower end to its base member 12 by a hinge 16 (FIG. 1) which permits the post to be hinged relative to base member 12 between the full line erected position shown in FIG. 2 and a collapsed position indicated by a broken line 14a in FIG. 1. The post is releasably maintained in its upright position by a turnbuckle 18 interconnected between hooks 20 on the post and base member. Wherein the turnbuckle is tightened, the flat bottom surface 22 is firmly held in position against the top of the associated base member 12.

The two side frame assemblies 10 are interconnected to each other by upper and lower cross brace assemblies (FIG. 2) designated generally 24, 26. Each cross brace assembly includes a pair of rigid brace members 28, 30 and 32, 34. Brace members 28 and 30 of the upper cross brace assembly 24 are each hingedly connected at one end to the post 14 of the side assemblies as by hinges 36 connected between the upper side of the brace members and the inner sides of the post 14. The other ends of each of the members 28 and 30 are connected to each other by a hinge 38 whose axis passes below members 28 and 30.

Similarly, the brace members 32 and 34 each have one end connected to the inner sides of the post 14 by hinges 40, which in this case have one leaf coupled to the under sides of members 32 and 34. The opposite ends of members 32 and 34 are connected to each other by a hinge 42 whose hinge axis is located above members 32 and 34. A turnbuckle 44 connected between brace base members 28 and 34 as by hooks 46 as shown in FIG. 2 maintains the brace members in the extended position shown in full line in FIG. 2, it being noted that hinges 38 and 42 when in this position have their leaves in flat face-to-face engagement with each other. When turnbuckle 44 is disengaged from the cross brace assemblies, the side frame assemblies 10 may be collapsed toward each other as viewed in FIG. 2, the upper and lower cross frame assemblies holding as indicated in broken line in FIG. 2. This lateral collapsing of the side frame assemblies 10 toward each other is normally performed only when the posts 10 of the side frame assemblies are in their collapsed position.

A vertically adjustable shelf 50 is detachably mounted upon the front side (the left side as view in FIG. 1) of posts 14 when the posts are in their erected position. The shelf 50 is supported for vertical adjustment by means of a commercially available shelf support system designated generally 52, whose components are partially shown in FIG. 3. This system includes a U-shaped channel member 54 formed with a plurality of vertically spaced openings 56 which are adapted to receive a hook shaped projection 58 mounted upon a bracket 60. The bracket 60 may be inserted into any one of the openings 56 to locate the bracket at a selected height on the channel member 54 which is in turn fixedly mounted into a groove cut in the face of post 14 in a well known manner.

When the table is in its erected position shown in full line in FIGS. 1 and 2, the shelf 50 provides a working surface whose height may be adjusted as desired. In the case where the table is employed in splicing multi-conductor cables C (FIG. 2) in the field, the cables may be located on the shelf 50 as shown and secured in position as by clamps or other suitable fixtures (not shown) to support the cables at a position where the splicing may be conveniently accomplished.

To collapse the table, the shelf 50 and brackets are detached as are turnbuckles 18 and 44. Posts 14 are then hinged downwardly to the collapsed position shown in broken line at 14a in FIG. 1 and the two side assemblies are then pushed toward each other, the cross brace assemblies 24 and 26 folding in the manner indicated in the broken line in FIG. 2 to permit the two side assemblies to be eventually located in substantially side-by-side relationship with each other. In that the posts are in their horizontal position when this is accomplished, the folded brace members 32, 34 of the lower cross brace asembly by slightly above base member 12 but do not project beyond the left hand end of the base member as viewed in FIG. 1.

While one embodiment of the invention has been described in detail, it will be apparent to those skilled in the art the disclosed embodiment may be modified. Therefore, the foregoing description is to be considered to be exemplary rather than limited, and true scope of the invention as that defined in the following claims.

What is claimed is:

1. A collapsible work table comprising:
   (a) first and second side frame assemblies, each side frame assembly including:
   (1) a single, elongate, horizontally disposed base member having a front end, a rear end, and a top surface;
   (2) a single, elongate post having an upper end, a lower end, a front surface, a side surface, and a rear surface;
   (3) a hinge with a hinge axis perpendicular to the elongate base member, connecting the lower end of the post to the top surface of the base member midway between the front and rear ends for pivoting movement between two positions in a vertical plane defined by the base member and the post, wherein the two positions are defined by an erected position with the post projecting vertically upward from the base member, and a collapsed position with the post projecting horizontally toward the rear end of the base member and with the rear surface of the post parallel to the top surface of the base member;
   (4) a pair of hooks, a first hook connected to the base member toward the forward end of the base member and a second hook connected to the post midway between the upper and lower ends; and
   (5) a turnbuckle connected to the first hook at one end and the second hook at another end to retain the base member and the post in the erected position;
   (b) a cross brace assembly including:
   (1) first, second, third and fourth rigid brace members, each brace member having an upper surface and a lower surface;
   (2) a first hinge connecting the upper surface of the first brace member to the side surface of the post of the first side frame assembly;
   (3) a second hinge connecting the upper surface of the second brace member to the side surface of the post of the second side frame assembly;
   (4) a third hinge connecting the lower surfaces of the first and second cross brace members together;
   (5) a fourth hinge connecting the lower surface of the third cross brace member to the side surface of the post of the first side frame assembly, below the first cross brace member;
   (6) a fifth hinge connecting the lower surface of the fourth cross brace member to the side surface of the post of the second side frame assembly, below the second cross brace member;
   (7) a sixth hinge connecting the upper surfaces of the third and fourth cross brace members together, wherein the brace members are hinged for pivoting movement between two positions in a plane defined by the post of the first and second side frame assemblies, wherein the two positions are further defined as an erected position with the upper and lower surfaces of the first, second, third and fourth brace members perpendicular to the side surfaces of the post of the first and second side frame assemblies, and a collapsed position with the upper and lower surfaces of the first, second, third and fourth brace members parallel to the side surfaces of the post of the first and second side frame assemblies;
   (8) a pair of hooks, a first hook connected to the first cross brace member and a second hook connected to the fourth cross brace member; and
   (9) a turnbuckle connected at one end to the first hook and at another end to the second hook to retain the brace members in the erected position;
   (c) a pair of U-shaped shelf support channels, with a plurality of vertically spaced, bracket-engaging apertures, one channel connected vertically to the front surface of each post of the first and second side frame assemblies, toward the upper end of each post;
   (d) first and second detachable self support brackets having a hook-shaped projection for vertically adjusting the brackets by engaging the vertically spaced apertures on the U-shaped channels connected to the posts of the first and second side frame assemblies respectively; and
   (e) a detachably mounted shelf, cantileverly supported by the first and second brackets from the posts of the first and second side frame assemblies respectively, extending outwardly from the post above the front end of the base member.

* * * * *

UNITED STATES PATENT OFFICE
CERTIFICATE OF CORRECTION

Patent No. 4,676,174                Dated June 30, 1987

Inventor(s) Robert A. Dingeldey

It is certified that error appears in the above-identified patent and that said Letters Patent are hereby corrected as shown below:

Column 2, line 49, delete "view" and insert --viewed--.

Column 3, line 16, delete "by" and insert --lie--.

In The Drawings

Sheet 1, Fig. 3, the reference numeral 54 applied to the vertically spaced openings should be changed to reference numeral 56.

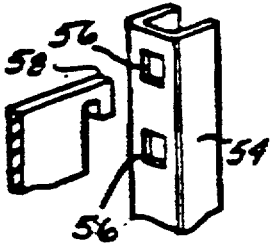

FIG-3

UNITED STATES PATENT OFFICE
CERTIFICATE OF CORRECTION

Patent No. 4,676,174           Dated  June 30, 1987

Inventor(s)  Robert A. Dingeldey

It is certified that error appears in the above-identified patent and that said Letters Patent are hereby corrected as shown below:

Column 1, line 56, delete "post" and insert --posts--.

Column 2, line 35, delete "base".

Column 3, line 16, delete "asembly" and insert --assembly--.

Column 4, line 48, delete "self" and insert --shelf--.

Signed and Sealed this

Eighth Day of December, 1987

Attest:

DONALD J. QUIGG

Attesting Officer

Commissioner of Patents and Trademarks